United States Patent [19]

Giacobbe

[11] Patent Number: 5,453,318
[45] Date of Patent: Sep. 26, 1995

[54] OLEFIN POLYMER FILMS

[75] Inventor: James Giacobbe, Philadelphia County, Pa.

[73] Assignee: Montell North America Inc., Wilmington, Del.

[21] Appl. No.: 207,767

[22] Filed: Mar. 8, 1994

Related U.S. Application Data

[62] Division of Ser. No. 18,634, Feb. 17, 1993, Pat. No. 5,331,047.

[51] Int. Cl.$^6$ .................................................. B32B 27/32
[52] U.S. Cl. ........................ 428/286; 428/290; 428/461; 428/516
[58] Field of Search .................... 428/286, 290, 428/461, 516

[56] References Cited

U.S. PATENT DOCUMENTS

| | | |
|---|---|---|
| 4,748,206 | 5/1988 | Noguva et al. |
| 4,842,930 | 6/1989 | Schinkel et al. |
| 4,871,813 | 10/1989 | Senez |
| 5,196,462 | 3/1993 | Berta |
| 5,212,246 | 5/1993 | Ogale |

*Primary Examiner*—Carman J. Seccuro, Jr.

[57] ABSTRACT

Disclosed are films or sheets comprising a blend of 1) a heterophasic olefin polymer composition and 2) a copolymer of ethylene with a $CH_2=CHR$ alpha-olefin, where R is a $C_{1-8}$ straight or branched alkyl.

Coextruded films or sheets and laminates wherein at least one layer is a film or sheet as described above, and films or sheets of blends of the olefin polymer composition and another olefin polymer are also disclosed.

8 Claims, No Drawings

OLEFIN POLYMER FILMS

This application is a division of application Ser. No. 08/018,634, filed Feb. 17, 1993, now U.S. Pat. No. 5,331,047.

FIELD OF THE INVENTION

This invention relates to thermoplastic films, sheets and laminates and coextruded materials formed therefrom, and films and sheets formed from blends of an olefin polymer composition applied to a base film or sheet of a metallic substrate or of different olefin polymer materials.

BACKGROUND OF THE INVENTION

In many film applications, such as packaging of foodstuffs, chemical and hazardous materials and in medical applications, the industry requires films having certain properties. In the packaging of foodstuffs, for example, the films must have high puncture resistance, high clarity and gloss, and reduced permeability to gases and/or vapors. The films used to manufacture containers for chemicals and hazardous waste materials must have a high puncture resistance, high elongation strength, high tear resistance and chemical resistance. Films used in medical applications, such as blood bags, must have a high puncture resistance, low modulus, high tear resistance and auto-clavability.

Thus, there is a need for a polymer material which has a lower flexural modulus, good tear strength, higher elastic recovery, reduced draw resonance, as well as all of the other desirable properties.

Films made from ethylene polymers, homopolymers, e.g., HDPE and LLDPE, and copolymers, e.g., LLDPE, and propylene polymers, such as crystalline homopolymers of propylene and random copolymers of propylene and ethylene, do not provide such a combination of desirable properties.

Attempts have been made to overcome the shortcomings of these polymers by preparing heterophasic mixtures of crystalline propylene polymers and 8 to 25% of an elastomeric propylene-ethylene copolymer by sequential polymerization in the presence of a stereospecific Ziegler-Natta type catalyst. However, films of such heterophasic compositions are subject to the formation of fisheyes, inadequate tear strength or the formation of rough surfaces.

SUMMARY OF THE INVENTION

It has now been found that compositions having low modulus, good tear strength, higher elastic recovery, reduced draw resonance, and retention of all of the other desirable properties can be obtained by blending ethylene copolymers with a heterophasic olefin polymer composition.

Accordingly, this invention provides a thermoplastic film having the desired properties comprising a blend of 1) a heterophasic olefin polymer composition which is comprised of:

(a) from about 10 to 50 parts of a propylene homopolymer having an isotactic index greater than 80, or a copolymer selected from the group consisting of (i) propylene and ethylene, (ii) propylene, ethylene and a $CH_2$=CHR alpha-olefin, where R is a $C_{2-8}$ straight or branched alkyl, and (iii) propylene and an alpha-olefin as defined in (a) (ii), said copolymer containing over 80% propylene and having an isotactic index greater than 80;

(b) from about 5 to 20 parts of a semi-crystalline, essentially linear copolymer fraction having a crystallinity of about 20 to 60%, wherein the copolymer is selected from the group consisting of (i) ethylene and propylene containing over 55% ethylene, (ii) ethylene, propylene, and an alpha-olefin as defined in (a) (ii) containing from 1 to 10% of the alpha-olefin and over 55% of both ethylene and alpha-olefin, and (iii) ethylene and an alpha-olefin as defined in (a) (ii) containing over 55% of said alpha-olefin, which copolymer is insoluble in xylene at room or ambient temperature; and (c) from about 40 to 80 parts of a copolymer fraction is selected from the group consisting of a copolymer of (i) ethylene and propylene wherein the copolymer contains from 20% to less than 40% ethylene and, (ii) ethylene, propylene, and an alpha-olefin as defined in (a) (ii) wherein the alpha-olefin is present in an amount of 1 to 10% and the amount of ethylene and alpha-olefin present is from 20% to less than 40%, and (iii) ethylene and an alpha-olefin as defined in (a) (ii) containing from 20% to less than 40% of the alpha-olefin, and optionally with 0.5 to 10% of a diene, said copolymer fraction being soluble in xylene at ambient temperature, and having an intrinsic viscosity of from 1.5 to 4.0 dl/g;

with the total of the (b) and (c) fractions, based on the total olefin polymer composition, being from about 50% to 90%, and the weight ratio of (b)/(c) being less than 0.4; and 2) a copolymer of ethylene with a $CH_2$=CHR alpha-olefin, where R is a $C_{1-8}$ straight or branched alkyl, having a density of 0.875 g/cm³ or greater.

In another embodiment this invention provides films comprising a layer of the blend of this invention applied to at least one surface of a thermoplastic film or a nonwoven material or a metallic substrate.

The films made from the blends of the present invention can be used in diapers, especially diaper cover stocks, especially bonded to scrim. In general, films from the blend of the invention can be used in personal care products, e.g. diapers and pull-ups; adult incontinence; disposable medical wear, such as gowns; shoe fascias; and feminine hygiene products.

DETAILED DESCRIPTION OF THE INVENTION

All parts and percentages used in this application are by weight unless otherwise specified. Ambient or room temperature is approximately 25° C.

Component 1) (a) is preferably present in an amount from 10 to 40 parts, most preferably from 20 to 35 parts. When (a) is a propylene homopolymer, the isotactic index is preferably from about 85 to 98. When (a) is a copolymer, the amount of propylene in the copolymer is preferably from about 90 to 99%.

Component 1) (b) is preferably present in an amount from 7 to 15 parts. Typically the crystallinity is about 20 to 60% by differential scanning calorimetry (DSC). Generally, the ethylene or said alpha-olefin content or the combination of ethylene and said alpha-olefin when both are used is over 55% up to 98%, preferably from 80 to 95%.

Component 1) (c) is preferably present in an amount from 50 to 70 parts. The ethylene or said alpha-olefin content or ethylene and said alpha-olefin content of component (c) is preferably from 20 to 38%, most preferably from 25 to 38%. When component (c) is a terpolymer, the said alpha-olefin is typically present in an amount from 1 to 10%, preferably 1 to 5%. The preferred intrinsic viscosity is from 1.7 to 3 dl/g.

The total amount of 1) (b) and (c), based on the total olefin polymer composition is preferably from 65 to 80% and the weight ratio of (b)/(c) is preferably from 0.1 to about 0.3.

The total amount of ethylene units or said alpha-olefin units, or of ethylene and said alpha-olefin units when both are present, in component 1) of the blend of this invention is from about 15% to about 35%.

In addition, the compositions of component 1) have a flexural modulus of less than 150 MPa, generally from 20 and 100 MPa; a tensile strength at yield of from 10 to 20 MPa, elongation at break over 400%; a tension set, at 75% strain, from 20% to 50%; a Shore D hardness from 20 and 35; and do not break (no brittle impact failure) when an IZOD impact test is conducted at −50° C.

Component 2) is a copolymer of ethylene with a $CH_2=CHR$ alpha-olefin, where R is a $C_{1-8}$, preferably a $C_{2-6}$, and most preferably a $C_{4-6}$ straight or branched alkyl. The alpha-olefin is present in an amount from about 1 to 10%, and preferably from 6–10%. Suitable ethylene copolymers useful as component 2) include ethylene/butene-1, ethylene/4-methyl-1-pentene, ethylene/hexene-1 and ethylene/octene-1. The copolymer can be a LLDPE, or VLDPE, preferably an LLDPE, where the comonomer is 1-octene. Preferably the density of the ethylene copolymer is 0.089 to 0.940 g/cm$^3$, and most preferably from 0.890 to 0.927 g/cm$^3$.

The blends of the present invention contain from 60 to 95%, by weight, of component 1) and from 5 to 40%, by weight, of component 2). Preferably, component 1) is present in an amount of from 90 to 75% and component 2) is present in an amount of from 10 to 25%.

The blends of this invention have at least one melt peak, determined by DSC, present at temperatures higher than 120° C., and at least one peak, relative to the vitreous transition, present at temperatures from −10° C. and −35° C.

Typically, the blends of the present invention have a flexural modulus of less than 150 MPa, generally from 20 to 100 MPa.

Copolymer and terpolymers of propylene and ethylene or an alpha-olefin or of propylene, ethylene and an alpha-olefin are preferred as component 1) (a), and copolymers of propylene with ethylene or an alpha-olefin are most preferred as component (a).

Suitable alpha-olefins of the formula $CH_2=CHR$ include butene-1, pentene-1, 4-methylpentene-1, hexene-1, and octene-1. When used to prepare component 1) (a) they are present in such quantities that the isotactic index of the resulting polymer is not less than 80%.

When a diene is present during the preparation of components 1) (b) and (c), it is typically a butadiene, 1,4-hexadiene, 1,5-hexadiene, ethylidene norbornene diene monomer and is typically present in amount from 0.5 to 10%, preferably 1 to 5%.

The component 1) can be prepared with a polymerization process comprising at least two stages, where in the first stage the propylene or propylene and ethylene or said alpha-olefin or propylene, ethylene or said alpha-olefin are polymerized to form component 1) (a), and in the following stages the mixtures ethylene and propylene or said alpha-olefin or ethylene, propylene and said alpha-olefin, and optionally a diene, are polymerized to form components 1) (b) and (c).

The polymerization can be conducted in liquid phase, gas phase, or liquid-gas phase using separate reactors, all of which can be done either by batch or continuously. For example, it is possible to carry out the polymerization of component 1) (a) using liquid propylene as diluent, and the polymerization of components 1) (b) and (c) in gas phase, without intermediate stages except for the partial degassing of the propylene. This is the preferred method.

The polymerization reactions are carried out in an inert atmosphere in the presence of an inert hydrocarbon solvent or of a liquid or gaseous monomer.

Suitable inert hydrocarbon solvents include saturated hydrocarbons, such as propane, butane, hexane and heptane.

Hydrogen can be added as needed as a chain transfer agent for control of the molecular weight.

The reaction temperature in the polymerization of component 1) (a) and for the polymerization of components 1) (b) and (c), can be the same or different, and is generally from 40° C. to 90° C., preferably 50° to 80° C. for the polymerization of component 1) (a), and 40° to 65° C. for the polymerization of components 1) (b) and (c).

The pressure of the polymerization of component 1) (a), if carried out in liquid monomer, is the one which competes with the vapor pressure of the liquid propylene at the operating temperature used, eventually modified by the vapor pressure of the small quantity of inert diluent used to feed the catalyst mixture, and the overpressure of optional monomers and the hydrogen used as molecular weight regulator.

The pressure of the polymerization of components 1) (b) and (c), if done in gas phase, can be from 5 to 30 atm. The residence times relative to the two stages depend on the desired ratio between fraction (a) and (b)+(c), and are usually from 15 min. to 8 hours.

The catalyst used in the polymerization comprises the reaction product of 1) a solid component containing a halogen-containing titanium compound and an electron-donor compound (internal donor) supported on an activated magnesium chloride, 2) a non-halogen containing Al-trialkyl compound and 3) an electron-donor compound (external donor).

Suitable titanium compounds include those with at least one Ti-halogen bond, such as halides and alkoxy halides of titanium.

In order to obtain these olefin polymer compositions in the form of flowable spherical particles having a high bulk density, the solid catalyst component must have a) a surface area smaller than 100 m$^2$/g, preferably between 50 and 80 m$^2$/g, b) a porosity from 0.25 to 0.4 cc/g. and c) an X-ray spectrum, where the magnesium chloride reflections appear, showing the presence of a halo between the angles 2ω of 33.5° and 35° and by the absence of the reflection at 2ω of 14.95°. The symbol ω=Bragg angle.

The solid catalyst component is prepared by forming an adduct of magnesium dichloride and an alcohol, such as ethanol, propanol, butanol and 2-ethylhexanol, containing generally 3 moles of alcohol per mole of MgCl$_2$, emulsifying the adduct, cooling the emulsion quickly to cause the adduct to solidify into spherical particles, and partially dealcoholating the particulate adduct by gradually increasing the temperature from 50° C. to 130° C. for a period of time sufficient to reduce the alcohol content from 3 moles to 1–1.5 moles per mole of MgCl$_2$. The partially dealcoholated adduct is then suspended in TiCl$_4$ at 0° C., such that the concentration of adduct to TiCl$_4$ is 40–50 g/l TiCl$_4$. The mixture is then heated to a temperature of 80° C. to 135° C. for a period of about 1–2 hr. When the temperature reaches 40° C., sufficient electron donor is added so that the desired molar ratio of Mg to electron donor is obtained.

An electron-donor compound selected preferably among the alkyl, cycloalkyl, and aryl phthalates, such as for example diisobutyl, di-n-butyl, and di-n-octyl phthalate, is added to the $TiCl_4$.

When the heat treatment period has ended, the excess hot. $TiCl_4$ is separated by filtration or sedimentation, and the treatment with $TiCl_4$ is repeated one or more times. The solid is then washed with a suitable inert hydrocarbon compound, such as hexane or heptane, and dried.

The solid catalyst component typically has the following characteristics:

| Surface area: | less than 100 m²/g, preferably between 50 and 80 m²/g |
| --- | --- |
| Porosity: | 0.25–0.4 cc/g |
| Pore volume distribution: | 50% of the pores have a radius greater than 100 angstroms. |
| X-ray spectrum: | where the Mg chloride reflections appear, showing a halo with maximum intensity between angles of 2 v of 33.5° and 35°, and where the reflection of 2 v of 14.95° is absent. |

The catalyst is obtained by mixing the solid catalyst component with a trialkyl aluminum compound, preferably triethyl aluminum and triisobutyl aluminum, and an electron-donor compound.

Various electron donor compounds are known in the art. The preferred electron donor compounds are those silane compounds having the formula $R'R''Si(OR)_2$ where R' and R'' may be the same or different and are $C_{1-18}$ normal or branched alkyl, $C_{5-18}$ cycloalkyl, or $C_{6-18}$ aryl radicals, and R is a $C_{1-4}$ alkyl radical.

Typical silane compounds which may be used include diphenyldimethoxysilane, dicyclohexyldimethoxysilane, methyl-t-butyldimethoxysilane, diisopropyldimethoxysilane, dicyclopentyldimethoxysilane, cyclohexylmethyldimethoxysilane and phenyltrimethoxysilane.

The Al/Ti ratio is typically between 10 and 200 and the Al/silane molar ratio between 1/1 and 1/100.

The catalysts may be precontacted with small quantities of olefin monomer (prepolymerization), maintaining the catalyst in suspension in a hydrocarbon solvent and polymerizing at a temperature from room temperature to 60° C. for a time sufficient to produce a quantity of polymer from 0.5 to 3 times the weight of the catalyst.

This prepolymerization also can be done in liquid or gaseous monomer to produce, in this case, a quantity of polymer up to 1000 times the catalyst weight.

The content and amount of catalyst residue in the thermoplastic olefin polymers of this invention is sufficiently small so as to make the removal of catalyst residue, typically referred to as deashing, unnecessary.

The heterophasic olefin polymer, component 1), prepared with the aforementioned catalyst are in spheroidal particle form, and the particles have a diameter from 0.5 to 7 mm.

The heterophasic olefin polymer used in the blends of this invention can be a "visbroken" polymer prepared from spherical particles as described above, having a melt flow rate (MFR, according to ASTM D-1238, measured at 230° C., 2.16 kg) of from 5 to 400, preferably from 10 to 200, and most preferably from 20 to 100, from an initial MFR of from 0.2 to 20, and preferably about 0.5 to 3.

Alternatively, component 1) can be produced directly in the polymerization reactor to the preferred MFR.

The process of visbreaking component 1) is well known in the art. Generally, it is carried out as follows: heterophasic olefin polymer material in "as polymerized" form, e.g., flaked, powders or spheres out of the polymerization reactor or pelletized, has sprayed thereon or blended therewith, a prodegradant or free radical generating source, e.g., a peroxide in liquid or powder form or a peroxide/polypropylene concentrate, such as Xantrix 3024 peroxide concentrate available from HIMONT U.S.A., Inc. The heterophasic olefin polymer material and peroxide is then introduced into means for thermally plasticizing and conveying the mixture, e.g., an extruder at elevated temperature. Residence time and temperature are controlled in relation to the particular peroxide selected (i.e., based on the half-life of the peroxide at the process temperature of the extruder) so as to effect the desired degree of polymer chain degradation. The net result is to narrow the molecular weight distribution of the polymer as well as to reduce the overall molecular weight and thereby increase the MFR relative to the as-polymerized polymer. For example, a polymer with a fractional MFR (i.e., less than 1), or a polymer with a MFR of 0.5 to 10, can be selectively visbroken to a MFR of 15 to 50, preferably 8 to 42, by selection of peroxide type, extruder temperature and extruder residence time without undue experimentation. Sufficient care should be exercised in the practice of the procedure to avoid crosslinking in the presence of an ethylene-containing copolymer; typically, crosslinking can be easily avoided where the ethylene content of the copolymer is sufficiently low.

The rate of peroxide decomposition is defined in terms of half-lives, i.e., the time required at a given temperature for one-half of the peroxide molecules to decompose. It has been reported (U.S. Pat. No. 4,451,589) for example, that using Lupersol 101 peroxide under typical extruder pelletizing conditions (450° F., 2½ minutes residence time), only $2 \times 10^{-13}$% of the peroxide would survive pelletizing.

In general, the prodegradant should not interfere with or be adversely affected by commonly used polypropylene stabilizers and should effectively produce free radicals that upon decomposition initiate degradstion of the polypropylene moiety. The prodegradant should have a short enough half-life at a polymer manufacturing extrusion temperatures, however, so as to be essentially entirely reacted before exiting the extruder. Preferably, they have a half-life in the polypropylene of less than 9 seconds at 550° F. so that at least 99% of the prodegradant reacts in the molten polymer before 1 minute of extruder residence time. Such prodegradants include, by way of example and not limitation, the following: 2,5-dimethyl-2,5-bis(t-butylperoxy) hexane-3 and 4-methyl-4-t-butylperoxy-2-pentanone (e.g. Lupersol 130 and Lupersol 120 peroxides available from Lucidol Division Penwalt Corporation); 3,6,6,9,9-pentamethyl-3-(ethylacetate)-1,2,4,5-tetraoxycyclononane (e.g., USP-138 peroxide from Witco Chemical Corporation); and 1,1'-bis(tert-butylperoxy)diisopropylbenzene (e.g., Vulcup R peroxide from Hercules Incorporated). Preferred concentration of the free radical source prodegradants are in the range of from about 0.01 to 0.4 percent based on the weight of the polymer. Particularly preferred is Luperol 101 peroxide.

The blends of the invention can be prepared by mechanically blending component 1) and component 2) by conventional mixing processes, in conventional compounding equipment.

Analytical Methods

Unless otherwise specified, the following analytical methods are used to characterize the supported catalyst component, the heterophasic olefin polymer compositions, films prepared therefrom and comparative film materials.

| Properties | Method |
| --- | --- |
| Melt Flow Rate, g/10 min. | ASTM-D 1238, condition L |
| Ethylene, wt % | I. R. Spectroscopy |
| Intrinsic viscosity | Determined in tetrahydronaphthalene at 135° C. |
| Xylene solubles, wt % | See description below. |
| Flexural modulus at 23° C. and Vitreous transition temperature | Using a device for dynamic-mechanical measurements of DMTA of Polymer Laboratories at a frequency measure of 1 $H_z$ and a scanning temperature of 2° C./min. A sample plaque (40 × 10 × 2 mm) of the polymer to be analyzed is cut from a pressure molded sheet prepared with a Carver press at 200° C. with 10 tons of pressure for 10 minutes and then cooling the sheet at 15° C./min. |
| Tension set at 75% | ASTM-D 412 |
| Tensile Strength at yield and at break | ASTM-D 638 |
| Elongation at yield and at break | ASTM-D 638 |
| Surface area | B.E.T. |
| Porosity | B.E.T. |
| Bulk density | DIN-53194 |
| Elemendorf tear | ASTM-D 1922-78 |
| Dart impact strength | ASTM D 4272-83 |

Unless otherwise specified, the compositions of the present invention are produced by a general procedure comprising tumble blending component 1), which has been visbroken with Lupersol 101, 2,5-dimethyl-2,5-bis(t-butylperoxy) hexane, and component 2) set forth below in the Examples. Samples of the blend to be subjected to the various physical-mechanical analyses are molded by use of a Negri & Bossi 90 injection press, after stabilizing the material with 0.05 pph Cyanox 1790 and 0.05 pph calcium stearate, and pelletizing it with a single screw Bandera extruder (cylinder diameter 30 mm) at 210° C. The analytical conditions are as follows:

temperature of the melt 250° C.
temperature of the mold 60° C.
injection time 20 sec.
cooling time 25sec.

The samples of the film materials were 0.8 to 2.2 mil in thickness and were cut from the film sheet in the size provided in the particular ASTM test method being used.

The weight percentage of the sum of the components 1) (b) and (c) fractions, indicated by % (b)+(c), is calculated by determining the weight of the mixture fed during the second stage, and comparing it with the weight of the final product.

The weight percentage (%) of the components 1) (a), (b), and (c) fractions described herein are determined as follows:

% $(a)=100\%-[(b)+(c)]$

% $(c)=S_f-P_aS_a$ where $S_f$ and $S_a$ are the percentage by weight of the portion soluble in xylene of the final product and the polypropylene fraction (a), respectively; $P_a$ is the weight ratio between said fraction and the final product.

% $(b)=100-\%\ (a)-\%\ (c)$

The percentage by weight of ethylene or said alpha-olefin or ethylene and said alpha-olefin contained in copolymer fraction component 1) (c) soluble in xylene is calculated using the following formula:

$$\text{wt. \% ethylene and/or said alpha-olefin in fraction } (c) = \frac{(C_f - C_a)}{1 - X} \cdot X$$

where:
$C_f$=% ethylene and/or said alpha-olefin in the xylene solubles of the final product;
$C_a$=% ethylene and/or said alpha-olefin in the xylene solubles of fraction (a);
$X=S_z \cdot P_a/S_f$ The intrinsic viscosity of fraction 1) (c), ($I.V._{(c)}$), is calculated using the following formula:

$$(I.V._{(c)})=(I.V._{sf}-I.V._{(a)}X)/(1-X)$$

where $I.V._{sf}$ is the intrinsic viscosity of the xylene soluble fraction of the final composition and $I.V._{(a)}$ is the intrinsic viscosity of the xylene soluble portion of component 1) (a) fraction.

The weight percent of component 1) soluble in xylene at room temperature is determined by dissolving 2.5 g of the polymer in 250 ml of xylene in a vessel equipped with a stirrer which is heated at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

Examples illustrative of the component 1), physical properties thereof, a process for preparing same, a film based on blends of said component 1) and component 2) and a method of preparing said film are set forth below.

Solid Catalyst Component

A) Preparation of MgCl$_2$/Alcohol Adduct

Under an inert atmosphere, 28.4 g anhydrous MgCl$_2$, 49.5 g of an anhydrous ethanol, 100 ml of ROL OB/30 vaseline oil and 100 ml of silicone oil having a viscosity of 350 cs are introduced into a reaction vessel equipped with a stirrer and heated at 120° C. with an oil bath and stirred until the MgCl$_2$ is dissolved. The hot reaction mixture is then transferred under inert atmosphere to a 1500 ml vessel equipped with an Ultra Turrax T-45 N stirrer and a heating jacket and containing 150 ml of vaseline oil and 150 ml of silicone oil. The temperature is maintained at 120° C. with stirring for 3 minutes at 3,000 rpm. The mixture is then discharged into a 2 liter vessel equipped with a stirrer containing 1,000 ml of anhydrous n-heptane cooled at 0° C. with a dry ice/isopar bath and stirred at a tip speed of 6 m/sec for about 20 minutes while maintaining the temperature at 0° C. The adduct particles thus formed are recovered by filtering, are washed 3 times at room temperature with 500 ml aliquots of anhydrous hexane and gradually heated by increasing the temperature from 50° C. to 100° C. under nitrogen for a period of time sufficient to reduce the alcohol content from 3 moles to 1.5 moles per mole of $MgCl_2$. The adduct has a surface area of 9.1 $m^2$/g and a bulk density of 0.564 g/cc.

B) Solid Catalyst Component Preparation

The adduct (25 g) is transferred under nitrogen into a reaction vessel equipped with a stirrer and containing 625 ml of $TiCl_4$ at 0° C. under agitation. It is then heated to 100° C. in 1 hr. When the temperature reaches 40° C., diisobutylphthalate is added in an amount such that the molar ratio of Mg to diisobutylphthalate is 8. The contents of the vessel are heated at 100° C. for 2 hours with agitation, the agitation is stopped and the solids are allowed to settle. The hot liquid is removed by siphon.

550 ml of $TiCl_4$ is added to the solids in the vessel and the mixture heated at 120° C. for 1 hr. with agitation. The agitation is stopped and the solids are allowed to settle. The hot liquid is then removed by siphon. The solids are washed 6 times at 60° C. with 200 ml aliquots of anhydrous hexane, and then 3 times at room temperature. The solids, after being vacuum dried, have a porosity of 0.261 cc/g, a surface area of 66.5 $m^2$/g and a bulk density of 0.44 g/cc.

EXAMPLES 1–3

These examples illustrate the heterophasic olefin polymer composition and a method for preparing the polymers.

General Operating Conditions

The polymerization runs are conducted under nitrogen in a 22 liter stainless steel autoclave equipped with a helicoid magnetic stirrer and operated at about 90 rpm.

All temperatures, pressures and concentrations of olefin monomers and hydrogen, when present, are constant unless otherwise indicated. The concentration of hydrogen and of the relative monomers is analyzed continuously in gas phase with a process gas chromatograph and fed in order to maintain constant the desired concentration of same.

The polymerization is a batch process conducted in two stages. The first stage comprising the polymerization of the relevant monomer or monomers in liquid propylene and the second stage the copolymerization of ethylene and propylene in gas phase.

In the first stage, the following ingredients in the order in which they are listed are fed into the autoclave at 20° C. over a period of about 10 minutes: 16 l of liquid propylene, appropriate quantities of ethylene and hydrogen, and the catalyst system consisting of 1) the solid catalyst component (about 0.15 g) prepared as described above, and 2) a mixture of 75 ml of triethyl aluminum (TEAL) at a 10% concentration in hexane and an appropriate quantity of cyclohexylmethyldimethoxysilane (CMMS) electron donor such that the Al/CMMS molar ratio is 7.5. The catalyst system is pressure fed into the autoclave with propylene.

The temperature is brought to the desired level in about 10 minutes and maintained constant throughout the entire polymerization reaction period. After the established reaction time has passed, essentially all of the unreacted monomer(s) is/are eliminated by degassing at 60° C. at essentially atmospheric pressure.

In the second stage, the polymer product (a) of the first stage, after taking a sample for the various analyses, is brought to the established temperature for the second stage. Propylene and ethylene are then fed into the autoclave at the ratio and in the quantities established in order to achieve the pressure and the gas phase composition desired. During the polymerization the pressure and gas phase composition are maintained by feeding the propylene and ethylene mixture established by way of instruments which regulate or measure or both regulate and measure the flow rate. The length of the feed varied according to the catalyst system employed and the amount of components 1) b) and c) desired in the particular heterophasic olefin polymer product.

At the end of the second stage polymerization reaction the powder is discharged, stabilized and then oven dried under a nitrogen stream at 60° C.

The ingredients and relative operating conditions are set forth in Table IA and the tests results are set forth in Table IB.

TABLE 1A

| Examples | 1 | 2 | 3 |
|---|---|---|---|
| 1st Phase | | | |
| Temperature, °C. | 70 | 70 | 70 |
| Pressure, atm. | 31 | 31 | 31 |
| Time, min. | 30 | 20 | 30 |
| $H_2$ in gas phase, mol % | 0.58 | 0.10 | 0.30 |
| Ethylene in gas phase, mol % | 1.45 | 2.60 | 2.50 |
| Ethylene in pol., wt. % | 3.0 | 4.3 | 4.1 |
| Intrinsic Visc., dl/g | 2.18 | 3.09 | 2.31 |
| Xylene Sol. ($S_a$), wt. % | 9.4 | 9.0 | 0.7 |
| Ethylene in Xylene Sol. ($C_a$), wt. % | 11 | 16 | 17 |
| Intrinsic Visc. Xylene Sol. (I.V.$_a$), dl/g | 1.15 | 1.39 | 1.19 |
| 2nd Phase | | | |
| Temperature, °C. | 50 | 50 | 50 |
| Pressure, atm. | 11.3 | 11.5 | 11.3 |
| Time, min. | 335 | 500 | 250 |
| $H_2$ in gas phase, mol % | 2.23 | 3.0 | 2.05 |
| Ethylene in gas phase, mol % | 15.9 | 16.9 | 22.54 |

TABLE 1B

| Examples | 1 | 2 | 3 |
|---|---|---|---|
| Final Product | | | |
| Yield, Kg Pol/g Cat | 11 | 16.3 | 9.9 |
| Comonomer, wt. % | 24.6 | 22.7 | 29.0 |
| Bipolymer (b) + (c), wt. % | 70 | 67 | 71.8 |
| Intrinsic Visc., dl/g | 2.05 | 2.3 | 2.34 |
| Xyl. Sol. ($S_f$), wt. % | 63.4 | 60.5 | 63.5 |
| Ethylene Xyl. Sol., wt. % ($C_f$) | 30.2 | 27.0 | 34.8 |
| Intrinsic Vis. Xyl. Sol. I.V.$_{sf}$, dl/g | 1.83 | 2.02 | 2.12 |
| Fraction (b), wt. % | 9.45 | 9.37 | 11.34 |
| Fraction (c), wt. % | 60.55 | 57.63 | 60.46 |
| Ethylene frac. (b), wt. % | 51.9 | 57.1 | 53.7 |
| Ethylene frac. (c), wt. % | 31.1 | 27.6 | 35.7 |
| Intrinsic Vis. frac. (c) (I.V.$^c$) , dl/g | 1.86 | 2.05 | 2.18 |
| Melt Index, °C. | 150 | 147 | 145 |
| Flexural modulus, MPa | 30 | 77 | 82 |
| R.C.I. IZOD at −50° C., J/m | NB[1] | NB | NB |

TABLE 1B-continued

| Examples | 1 | 2 | 3 |
|---|---|---|---|
| Shore D hardness | 24 | 25 | 20 |
| Tension Set at 75%, % | 41 | 28 | 36 |
| Tensile strength, MPa | 13.8 | 15.8 | 15.4 |
| Tensile strength at yield, MPa | 5.0 | 5.8 | 4.6 |
| Elongation at break, % | 517 | 925 | 940 |
| Haze, % | 31 | 34 | 35 |
| Vitreous transition[2], °C. | −25(P) | −23(P) | −28(P) |
|  | −75 | −119 | −81 |
|  | −128 | −121 | −125 |

[1]NB = no break
[2](P) = main peak

EXAMPLE 4

This example illustrates a cast film material of a blend of the present invention and a method for preparing the same.

A cast film of the blend of the present invention containing 1) 75% of a heterophasic olefin polymer material composition, produced according to the method of example 2, except that, component 1 (a) is present in an amount of about 37% and 63% is component 1 (b)+(c), visbroken to 30 MFR from an initial, as polymerized MFR of 0.8; and 2) 25% of DOWLEX 2045, a linear low density polyethylene containing octene-1, having a melt index of 1.0 g/10 min and a density of 0.92, is prepared by charging the blend into an extruder, extruding it through a flat film die and quenching onto a chill roll to produce a film of 0.8 mil thickness using the following equipment and processing conditions:

Screw design:
  Compression ratio 4:1 to 2:1.
  Feed zone depth: 0.435 to 0.490" (3.5" extruder with 3.5:1 compression ratio)
  Metering zone depth: 0.125 to 0.140" for 3.5" extruder.
Die: Conventional center-fed coathanger manifold.
Extruder operating conditions:
  Melt temperature: 400°–460° F.
  Extruder Barrel: 350°–420° F. from zone 1 to zone 6
  Adapter and die temperatures: 420° F.

Control 1

A cast film material of a heterophasic olefin polymer material composition, obtained by sequential polymerization in at least two stages, containing 37% of a propylene-ethylene copolymer, (96.7:3.3 wt. ratio of polymerized units), and 63% of an ethylene-propylene copolymer, (29:71 wt. ratio of polymerized units), visbroken to 30 MFR from an initial, as polymerized MFR of 0.8, prepared according to the procedure described above.

TABLE 2

| ELONGA-TION | CONTROL | | EXAMPLE 4 | |
|---|---|---|---|---|
|  | % DEFORM. | % RECOVERY | % DEFORM. | % RECOVERY |
| 10% | 4.1 | 95.9 | 5.3 | 94.7 |
| 25% | 11.8 | 88.2 | 11.8 | 99.2 |
| 50% | 17.0 | 83.0 | 15.7 | 84.4 |
| 75% | 20.2 | 79.8 | 19.1 | 81.0 |

As demonstrated in Table 2 above, at 10% and 25% elongation very little difference is seen in the % deformation and recovery between example 4 and control. However, at elongations of 50% and 75%, in the blend of the present invention, example 4, the percent deformation decreases and the percent recovery increases, whereas the percent deformation increases and the percent recovery decreases in the composition of the control, which does not contain LLDPE.

Illustrated in Table 3 is the tear strength and impact strength of cast film material of the blend of the present invention, Example 4, and the control composition, which does not contain LLDPE.

TABLE 3

| PROPERTIES | CONTROL | EXAMPLE 4 |
|---|---|---|
| Film Thickness, mil | 2.2 | 2.2 |
| Elmendorf Tear Strength, g (MD/CD) | 430/610 | 440/790 |
| Dart Impact Strength, g | 520 | 740 |

As demonstrated in Table 3, a significant increase in the tear and impact strength of the blend of the invention is obtained, as compared to the control, which does not contain LLDPE.

Various types of film materials of conventional thickness and thin films less than 20 mils thick to as thin as about 0.5 mils can be prepared using the heterophasic olefin polymer composition described herein as well as heavy film materials, typically referred to as sheets, from 20 to 100 mils thick. For example, it can be used to prepare cast films, uniaxially and biaxially oriented films and extruded or calendared sheets. In addition a layer comprising the heterophasic olefin polymer composition can be applied to, e.g. by lamination, extrusion coating or coextrusion techniques, at least one surface of a thermoplastic film material or a metallic sheet or foil substrate or a woven or non-woven material.

Typical thermoplastic materials include crystalline homopolymers of a $C_{2-10}$ alpha-olefin monomer, such as propylene or ethylene, or copolymers of propylene with ethylene or with a $C_{4-10}$ alpha-olefin monomers or of propylene with both ethylene and a $C_{4-10}$ alpha-olefin monomers, provided that, when the comonomer is ethylene, the maximum polymerized ethylene content is about 10%, preferably about 4%, and when the comonomer is a $C_{4-10}$ olefin, the maximum polymerized content thereof is about 20%, preferably about 16%, and when both ethylene and an alpha-olefin are used the maximum polymerized content of both is 30%, preferably 20%, as well as polyesters, polyamides, ethylene-vinyl alcohol copolymers and ethylene-vinyl acetate copolymers. Aluminum is a suitable metallic substrate.

In addition, film materials can be prepared from blends of from about 5 to 45% of the present invention described herein with from about 95 to 55% of a crystalline homopolymer of a $C_{2-10}$ alpha-olefin monomer or copolymer of propylene with ethylene or with a $C_{4-10}$ alpha-olefin monomer or of propylene, ethylene and a $C_{4-10}$ alpha-olefin monomer, said copolymer having the maximum polymerized content of ethylene or alpha-olefin or both as described in the preceding paragraph. Preferably, the amount of the blend of the present invention in such blends is from 10 to 30%.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A film or sheet article comprising a base film or sheet of: (a) a crystalline homopolymer of a $C_{2-10}$ alpha-olefin monomer, (b) a copolymer selected from the group consisting of (i) propylene with ethylene, (ii) propylene with ethylene and a $C_{4-10}$ alpha-olefin monomer, and (iii) propylene with a $C_{4-10}$ alpha-olefin monomer, provided that, when the comonomer is ethylene, the maximum polymerized ethylene content is about 10%, when the comonomer is a $C_{4-10}$ alpha-olefin, the maximum polymerized content thereof is about 20% and when both ethylene and a $C_{4-10}$ alpha-olefin are used the maximum polymerized content is about 30%, or (c) a metallic substrate; and applied to at least one surface thereof a layer of a film or sheet material comprising a blend of 1) from 95 to 60%, by weight of a heterophasic olefin polymer composition prepared by polymerization in at least two stages which is comprised of:

(a) from about 10 to 50 parts of a propylene homopolymer having an isotactic index greater than 80, or a copolymer selected form the group consisting of (i) propylene and ethylene, (ii) propylene, ethylene and $CH_2=CHR$ alpha-olefin, where R is a $C_{2-8}$ straight or branched alkyl, and (iii) propylene and an alpha-olefin as defined in (ii), said copolymer containing over 80% propylene and having an isotactic index greater than 80;

(b) from about 5 to 20 parts of a semi-crystalline, essentially linear copolymer fraction having a crystallinity of about 20 to 60%, wherein the copolymer is selected from the group consisting of (i) ethylene and propylene containing over 55% ethylene, (ii) ethylene, propylene, and an alpha-olefin as defined in (a)(ii), containing from 1 to 10% of the alpha-olefin and over 55% of both ethylene and alpha-olefin, and (iii) ethylene and an alpha-olefin as defined in (a)(ii) containing over 55% of said alpha-olefin, which copolymer is insoluble in xylene at room temperature; and (c) from about 40 to 80 parts of a copolymer fraction, wherein the copolymer is selected from the group consisting of (i) ethylene and propylene containing from 20% to less than 40% ethylene, (ii) ethylene, propylene and an alpha-olefin as defined in (a)(ii), wherein the alpha-olefin is present in an amount of from 1 to 10%, and the amount of ethylene and alpha-olefin present is from 20% to less than 40%, and (iii) ethylene and an alpha-olefin, as defined in (a)(ii), containing from 20% to less than 40% of said alpha-olefin, and optionally with 0.5 to 10% of a diene, said copolymer fraction being soluble in xylene at ambient temperature, and having an intrinsic viscosity of from 1.5 to 4.0 dl/g;

with the total of the (b) and (c) fractions, based on the total olefin polymer composition, being from about 50% to 90%, and the weight ratio of (b)/(c) being less than 0.4; and 2) from 5 to 40%, by weight of a copolymer of ethylene with a $CH_2=CHR$ alpha-olefin, where R is a $C_{1-8}$ straight or branched alkyl, having a density of 0.875 g/m$^3$ or greater.

2. A film or sheet article of claim 1, wherein said base film or sheet is (a).

3. A film or sheet article of claim 1, wherein said base film or sheet is a metallic substrate.

4. A film or sheet article of claim 2, wherein said base film or sheet is (b).

5. A nonwoven article having applied to at least one surface thereof a layer of a film or sheet material comprising a blend of 1) from 95 to 60%, by weight of a heterophasic olefin polymer composition which prepared by polymerization in at least two stages is comprised of:

(a) from about 10 to 50 parts of a propylene homopolymer having an isotactic index greater than 80, or a copolymer selected form the group consisting of (i) propylene and ethylene, (ii) propylene, ethylene and $CH_2=CHR$ alpha-olefin, where R is a $C_{2-8}$ straight or branched alkyl, and (iii) propylene and an alpha-olefin as defined in (ii), said copolymer containing over 80% propylene and having an isotactic index greater than 80;

(b) from about 5 to 20 parts of a semi-crystalline, essentially linear copolymer fraction having a crystallinity of about 20 to 60%, wherein the copolymer is selected from the group consisting of (i) ethylene and propylene containing over 55% ethylene, (ii) ethylene, propylene, and an alpha-olefin as defined in (a)(ii), containing from 1 to 10% of the alpha-olefin and over 55% of both ethylene and alpha-olefin, and (iii) ethylene and an alpha-olefin as defined in (a)(ii) containing over 55% of said alpha-olefin, which copolymer is insoluble in xylene at room temperature; and (c) from about 40 to 80 parts of a copolymer fraction, wherein the copolymer is selected from the group consisting of (i) ethylene and propylene containing from 20% to less than 40% ethylene, (ii) ethylene, propylene and an alpha-olefin as defined in (a)(ii), wherein the alpha-olefin is present in an amount of from 1 to 10%, and the amount of ethylene and alpha-olefin present is from 20% to less than 40%, and (iii) ethylene and an alpha-olefin, as defined in (a)(ii), containing from 20% to less than 40% of said alpha-olefin, and optionally with 0.5 to 10% of a diene, said copolymer fraction being soluble in xylene at ambient temperature, and having an intrinsic viscosity of from 1.5 to 4.0 dl/g;

with the total of the (b) and (c) fractions, based on the total olefin polymer composition, being from about 50% to 90%, and the weight ratio of (b)/(c) being less than 0.4; and 2) from 5 to 40%, by weight of a copolymer of ethylene with a $CH_2=CHR$ alpha-olefin, where R is a $C_{1-8}$ straight or branched alkyl, having a density of 0.875 g/m$^3$ or greater.

6. A nonwoven article of claim 5, wherein of said film or sheet material component 1) is present in an amount of from 90 to 75% and, component 2) is present in an amount of from 10 to 25%.

7. A film or sheet article of claim 1, further comprising a nonwoven article applied to at least one surface thereof.

8. A film or sheet article of claim 1, wherein of said film or sheet material component 1) is present in an amount of from 90 to 75% and, component 2) is present in an amount of from 10 to 25%.

* * * * *

UNITED STATES PATENT AND TRADEMARK OFFICE
CERTIFICATE OF CORRECTION

PATENT NO. : 5,453,318

DATED : September 26, 1995

INVENTOR(S) : James Giacobbe

It is certified that error appears in the above-identified patent and that said Letters Patent is hereby corrected as shown below:

At col. 5, lines 25 & 26, change "v" to -- $\sqrt{g}$ --.

At col. 6, line 27, change "8" to --28--.

At col. 14, line 7, delete "which".

At col. 14, line 8, before "is", insert --which--.

Signed and Sealed this

Fifteenth Day of October, 1996

*Attest:*

BRUCE LEHMAN

*Attesting Officer*     *Commissioner of Patents and Trademarks*